Feb. 18, 1969 J. H. LEMELSON 3,427,714

DUCTED PANEL FABRICATION

Filed Aug. 23, 1963

INVENTOR.
Jerome H. Lemelson

United States Patent Office 3,427,714

Patented Feb. 18, 1969

3,427,714

DUCTED PANEL FABRICATION

Jerome H. Lemelson, 85 Rector St., Metuchen, N.J. 08840

Continuation-in-part of applications Ser. No. 589,300, June 4, 1956, and Ser. No. 589,848, May 28, 1956. This application Aug. 23, 1963, Ser. No. 304,165

U.S. Cl. 29—626 6 Claims

Int. Cl. H05k *3/30, 1/02*

ABSTRACT OF THE DISCLOSURE

A method is provided for fabricating a circuit board having both electrical conducting elements and a heat transfer fluid conduit secured to said circuit board. In one form of the invention, the conduit and electrical circuit elements may be formed of the same sheet of metal bonded to a surfaec of the circuit board. The fluid conducting conduit may be also expanded in-situ on the surface of the circuit board substrate after the sheet of which is fabricated is bonded thereto. The metal conduit may also serve as a circuit element and conducts heat transfer fluid across the surface of the board for predeterminately controlling the temperature of the circuit board and electrical devices mounted thereon.

This invention relates to ducted panel construction and is a continuation-in-part of applications Ser. Nos. 589,300 and 589,848 filed respectively on June 4, 1956 and May 28, 1956, the former now abandoned and the latter being U.S. Patent 3,166,829 entitled Ducted Sheeting Construction and issued on Jan. 26, 1965.

Improved methods of fabricating metal sheeting with ducts formed therein for heat exchanger applications are known to the art by the commercial designations Tube-In-Strip and Roll Bond methods. By these techniques, a sheet of metal is provided with one or more nonfused strip formations extending in a plane through said sheet between the major faces thereof and one or more vein-like ducts are formed in the sheet by applying sufficient fluid pressure to said nonfused strip areas to essentially inflate one or both of the walls thereof into a duct.

A problem encountered in the fabrication and use of electrical and electronic equipment at elevated or low temperatures experienced for example, during the flight of a high speed airplane or missile, is the matter of maintaining a fixed temperature or temperature range for portions of said equipment or of at least one or more components thereof so as not to damage, destroy or change the operating characeristics of said components. Semiconductors for example vary considerably in operating characteristics as the temperature of said semiconductor varies.

Presented herein are a number of solutions to the problem of maintaining the volume immediately surrounding an enclosure electronic component, circuit or other device at a predetermined temperature during its operation. Improved fabrications of ducted panelling and electrical circuit boards and components are also attained as related to heat exchangers and controls associated with electronic and electromechanical equipment.

It is a primary object of this invention to provide new and improved panel constructions utilizing metal having integral ducts formed within a sheet.

Another object of this invention is to provide new and improved ducted panel constructions for heat exchanger applications involving electrical equipment and the like.

Another object is to provide a new and improved fluid cooling arrangement for electronic components and complete circuits operative at high temperatures.

Another object is to provide new and improved means of fabricating electrical circuit boards having heat exchanger means provided directly on or in the circuit board itself.

Another object is to provide improved means for shaping and fabricating ducted sheeting into enclosures, housings and the like for use in heat exchanger applications.

Another object is to provide improved means for mounting electronic and electrical components on circuit boards.

Another object is to provide improvements in heat exchanger devices for use with electrical equipment and enclosures.

Another object is to provide new and improved electrical conducting means utilizing ducted sheeting as a mount or base for said conducting means.

With the above and such other objects in view as may hereafter more fully appear, the invention consists of novel constructions, combinations, and arrangements of parts as will be more fully described and illustrated in the accompanying drawings, but it is to be understood that changes, variations and modifications may be resorted to which fall within the scope of the invention, as claimed.

Figure 1:
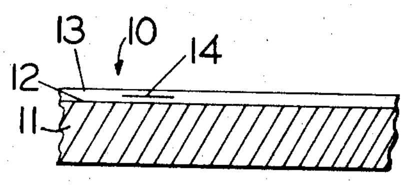
FIG. 1 is a view in cross-section of a fragment of a laminated assembly including a sheet of metal and a circuit board.

FIGS. 1 to 5 illustrate steps in a process for producing so-called printed circuits and circuit boards of the type illustrated, for example, in FIG. 12 which comprise a major component of this invention .In FIG. 1 a portion of a circuit board assembly 10 is illustrated prior to forming individual circuit elements thereon and comprises a base sheet or substrate 11 of any suitable insulating material such as ceramic, glass, fibre, thermosetting resins such as epoxy, phenolic, or laminates, various materials as known in the art of etched printed wiring manufacture. Bonded to a surface 12 of board or sheet 11 it is a thin sheet 13 of any suitable metal such as copper, aluminum, brass or the like which is fabricated with one or more flat, narrow strip volumes 14 disposed between the major faces of said sheet 13 which is capable of being expanded into larger fluid conduits. Sheet 13 is preferably fabricated by the so-called Tube-In-Strip or Roll-Bond methods. The Roll-Bond method is described in U.S. Patent 2,662,273 and permits the frontward expansion of the material adjacent to strip volume 14 to define a vein-like duct in the sheet.

Figure 2:
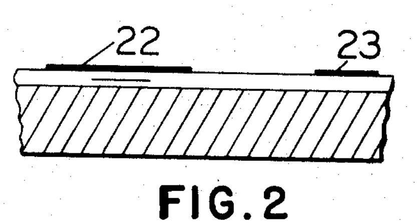
FIG. 2 shows the assembly of FIG. 1 containing etch-resist material applied to selected areas of the metal sheets.

In FIG. 2 an acid-resistant coating 22 is applied above and to the sides of the strip volume 14 by means of a suitable printing, photographic or stencil-screen means, and one or more additional strips of 23 of acid resistant material are also applied to the outer surface of 13 to define elements to remain on the surface of the base 11 after etching.

Figure 3:
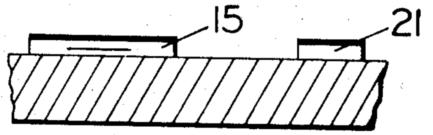
FIG. 3 shows portions of the metal sheet of FIG. 1 removed after etching.

In FIG. 3 the laminate 10 has been submerged in a tank of acid etchant leaving only strip-like portions 15 and 21 of the sheet which are directly beneath the applied coatings 22 and 23. These strip-like portions 15 and 21 become respective circuit elements which are separated from each other. The circuit element 15 is shown having the strip-like volume 14 centrally disposed therein and both elements 15 and 21 may extend in any suitable or predetermined path or pattern around the surface of the circuit board to define means for conducting electricity to various components which are thereafter electrically secured to said elements and to one or more other elements, not shown, which remain on either or both of the surfaces of the insulating member 11.

Figure 4:
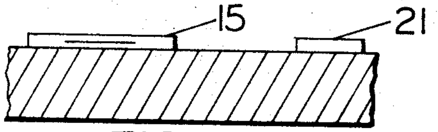
FIG. 4 shows the etch-resist material removed from the remaining portions of the metal sheet.

In FIG. 4 the acid-resistant portions 22 and 23 of the plastic coating applied through the outer surface of 13 have been removed.

Figure 5:
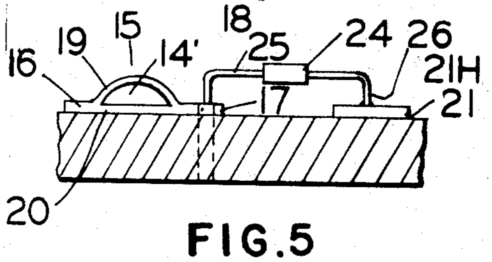
FIG. 5 shows a portion of the remaining metal sheet inflated and an electrical component connected thereto and the remaining portion.

In FIG. 5, the strip-like volume 14 of remaining element 15 has had fluid pressure applied thereto to outwardly expand the portion 19 of the metal sheet adjacent said strip-like volume while the other adjacent portion 20 has remained flat against the upper surface 12 of 11. Notations 16 and 17 define flange extensions of the central conduit portion 19 of element 15 which serve the function not only of retaining the conduit against the upper surface 12 of sheet 11 but may also be utilized for electrically connecting other surface strip elements or electrical components to 15. Illustrated in FIG. 5 is an electrical device 24 such as a resistor or conductor having leads 25 and 26 extending therefrom. The lead 25 is shown inserted into a hole 18 which is either etched or drilled in the flange 17 of conduit-conductor 15 and is soldered or welded thereto. The lead 25 may also be abutted against the upper surface of 17 and pressure or resistance welded thereto. The second lead 26 is shown extending into a hole 21H in the flat strip conductor element 21 and is welded or soldered thereto.

The structure shown in FIG. 5 is intended to illustrate but part of a circuit board containing a plurality of strip-like elements 21 and a plurality of conduit elements similar to 15 extending in any suitable array or circuit around and across the surface or surfaces of the base member 11. It is noted that the flanges 16 and 17 may be of equal or different widths and may vary in configuration depending on the circuit requirements. For example, one or more conduits such as 19 may branch off the conduit illustrated in FIG. 5 as shown, for example, in FIG. 12 and one or more strip elements may extend as branch portions of either or both of the flange portions 16 and 17 of 15 to define connections with other circuit elements or leads thereof.

The conduit portion 19 having an expanded volume 14′ defined thereby is preferably connected to a source of pressurized fluid at one end thereof and at another point along the length of said conduit to an exhaust port or a fluid line leading to the exhaust end of the fluid supply system for recirculating a heat transfer fluid through said conduit.

If it is desired to cool electrical components by convection flow of fluid, one or more holes may be provided in either of the walls 19 or 20 of the member 15 and disposed so as to cause fluid conducted thereby to exhaust over and around said components.

In still another form of the invention, the interior surface of the fluid conductor defined by wall portions 19 and 20 may be coated first with an insulating material and then with an electrically conducting material which is insulated from 15 and may comprise either another electrical circuit component or an electrical resistance heating means when connected to a source of electrical energy for heating fluid passed through the conduit and or adjacent portions of the assembly 10.

Figure 6:
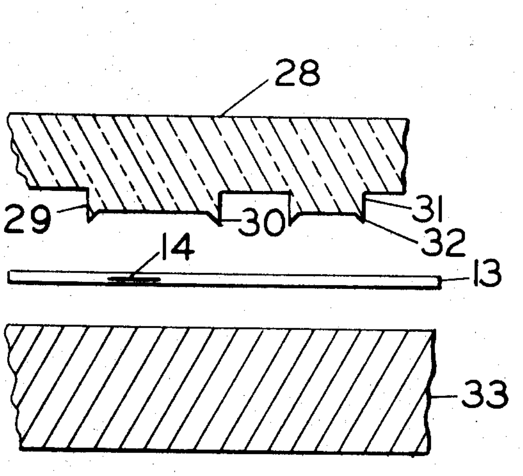
FIG. 6 shows an arrangement including a tool, a ducted metal sheet and a circuit board prior to formation of circuits.
Figure 7:
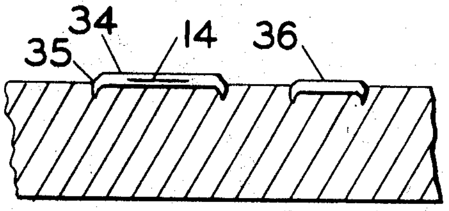
FIG. 7 shows portions of the sheet of FIG. 6 stamped and secured to the circuit board after the operation of the tool.
Figure 8:
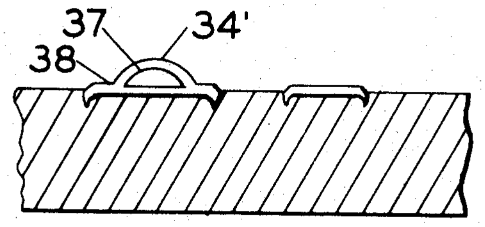
FIG. 8 shows one of the stamped portions of FIG. 7 inflated.

Shown in FIGS. 6–8 is another method for fabricating circuit elements of the type illustrated in FIGS. 1–5 on the surface of an insulating sheet or board or substrate. A sheet of thin metal 13 of the type provided in FIG. 1 is disclosed between a stamping die 28 and a circuit board sheet 33 which is held against a surface of a platen, not shown, which is part of a press assembly 27 of which only 28 is illustrated. The die 28 has a cutting portion 29 having cutting edges 30 disposed so as to sever a portion 34 of the sheet 13 containing a non-fused interfacial strip volume 14 of the type described. In FIG. 7 the dye 28 has cooperated with sheet 33 in severing portion 34 of the sheet 13 from the rest of the sheet and in causing said portion to have its edges 35 downwardly deflected and penetrating the surface of 33 to effect mechanical securing thereto. If heat is also utilized and an adhesive on the bottom surface of 13, the technique which is known as stamped printed wiring will provide the portion 34 as being mechanically and adhesively secured to 33.

Also shown in FIG. 6 is a second die portion 31 having cutting edges 32 and extending as a strip across the surface of 28 for severing a second strip such as 36 illustrated in FIG. 7 from the remainder of the sheet. The strip 36 defines a flat strip circuit element which may or may not be electrically connected to 34 during the fabrication thereof or through an electrical component extending between said two strips.

In FIG. 8 the strip-like volume 14 has been expanded by applying fluid pressure to one end thereof while collapsing or closing the other end of said volume and the resulting member 34′ may be utilized to conduct a heat transfer fluid across predetermined portions of the circuit board 33 for cooling and or heating selected portions of said board depending on the nature of the fluid carried through the expanded volume. Notation 37 refers to that portion of the sheet adjacent strip volume 14 which is outwardly expanded from the board and 38 to one of the two side flange portions of the remaining portion 34 of the sheet containing said conduit portion.

As provided in FIGS. 1–5 the flange portions 38 of the expanded conduit 34′ may be electrically connected or extend in any suitable circuit or contour around the surface of the board 33 for performing various functions.

Figure 9:
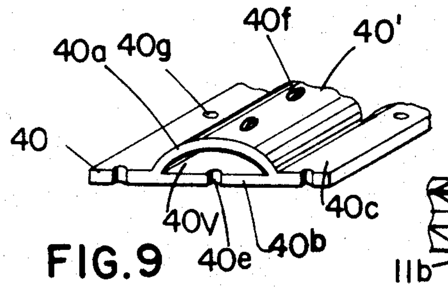
FIG. 9 shows, the isometric section, a fluid conductor made from sheet material of the type provided in FIGS. 1 and 6 which may also be an electrical conductor; FIG. *9a* shows an assembly of the material of FIG. 9 with a circuit board.
Figure 9A:
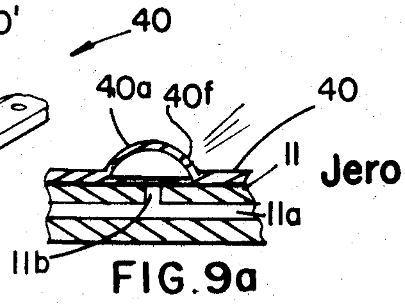

In FIG. 9 is shown a portion of an inflated or expanded sheet of the type illustrated in FIGS. 5 and 8 modified with a plurality of small holes provided in either or both of those portions of the sheet which define the side walls of the vein-like conduit in said sheet. Said holes may be utilized for dispensing a fluid such as a liquid, gas or vapor from the conduit to the volume exterior thereof and/or for admitting a fluid to said conduit volume. Simple means are provided hereafter for producing such a conduit at low cost and for utilizing said conduit for various purposes including heat transfer relative to the volume surrounding the sheet containing the conduit, fluid mixing and dispensing and the atomization or spray of a fluid over an extended area.

In FIG. 9 the sheet 40 is shown formed with a centrally disposed conduit portion provided by expansion of the wall 40*a* away from the previously mentioned strip-like volume to define an expanded volume 40V confined between portions 40*a* and 40*b* of the sheet. The flat wall 40*b* extends laterally at both sides of the conduit as flange portions 40*c* and 40*d*. Provided in the flat wall 40*b* of the conduit are a plurality of small holes 40*e* which may extend along a substantial length of said conduit wall. Also illustrated in FIG. 9 are a plurality of holes 40*f* in the deformed upper wall 40*a* of the conduit and a plurality of holes 40*g* in each of the flanges of the ducted sheet 40. The holes 40*e* may be utilized for admitting a fluid to the conduit and/or for expelling said fluid therefrom as a plurality of streams or jets. The holes 40*f* may be utilized for admitting or expelling fluid from the conduit relative to the surrounding volume for heat transfer or spray purposes. In a preferred embodiment, holes are provided in only one of the walls of the conduit at close spacings for ejecting streams of a fluid into the surrounding volume although the provision of holes in both walls may be utilized in a structure as illustrated in FIG. *9a*.

FIG. *9a* illustrates a circuit board 11 having a conduit or opening 11*a* disposed between the major faces thereof and having one or more holes 11*b* extending from 11*a* to the upper surface of 11 and communicating with the interior of a conduit of the type illustrated in FIG. 9 through a hole 40*e* in the wall thereof one or more holes 40*f* in the upper wall of the conduit portion of the sheet are disposed so as to provide streams of the fluid flowing against and over specific components mounted adjacent said sheet for heat transfer purposes. If the conduit 40 is provided with means for flowing a heat transfer fluid therethrough from an edge of said conduit, the holes communicating therebetween and the passageway 11*a* in sheet 11 may be utilized for conducting fluid from the conduit to the circuit board 11 for heat transfer or other purposes.

It is noted that the structure illustrated in FIG. *9a* may have applications in the construction of chemical processing equipment whereby sheet 11 defines the major portion of the wall of a vessel, pipe or support for the conduit containing sheet 40 and the conduit of said sheet is utilized for dispensing a fluid over an extended area thereof to the surrounding volume without the need for applying a plurality of tubular conduits to the sheet.

The size and spacing of the holes 40*e* and/or 40*f* in the conduit walls may be in the range of .005 to .1" dia. spaced .1 to .5" apart. The holes may also extend laterally across the conduit as well as longitudinally. Diameter and the spacing of the holes' wall or walls of the conduit will depend on the particular fluid system requirements. For example, if a plurality of fine sprays are desired over an extended area, the conduit 40' may extend in a winding or plurality of parallel paths across the surface of the ducted sheet 40 and may have very small holes drilled, etched, stamped or otherwise provided in either or both walled portions of the conduit at very close spacings. Said holes, for example, may be provided in the order of .010 to .005 inch in diameter or less by means of focusing one or more electron beams or laser beams against one wall in the conduit formation 40' after it has been formed in the sheet 40 and such holes may be spaced less than .020 inch apart both longitudinally and laterally along the conduit wall. Such an array of holes will provide a fine spray of liquid adjacent the sheet 40 along each conduit which may be utilized for transpirational cooling purposes, fluid mixing and dispensing functions relative to chemical reactions, etc.

The tube sheet structures illustrated in FIGS. 9 and *9a* may be produced by providing a flat sheet of metal such as 13 of FIG. 1 having one or more non-fused strip-like volumes interposed between the major faces of the sheet and having holes drilled or otherwise provided through the metal adjacent the strip-like volume from one face of the sheet. The other face of the sheet is abutted against a platen while the face containing the holes is abutted by a rubber blanket which is held thereagainst by suitable means with sufficient force to seal the openings from the face to the strip-like volume 14 while sufficient fluid pressure is applied to said volume 14 to cause metal adjacent the rubber blanket and bounding said volume 14 to outwardly expand into said rubber blanket. If two rubber blankets are provided, each compressed against a respective face of the sheet, holes in both walls of the inflated duct may be provided.

In FIG. 9 is shown an electrical device which may comprise a portion of the circuit board structures hereinabove or hereinafter described or may be utilized as a circuit element per se to be assembled with various electrical devices. The device 40 is made of a sheet of metal preferably produced in accordance with the teaching of U.S. Patent 2,662,273 and having a central conduit portion 40*a* with side flange portions 40*c*–40*d* extending outward therefrom along the length of 40. The deformed conduit wall 40*a* extends from a flat portion 40*b* which is a central extension of the flange portions 40*c*, 40*d*.

A plurality of holes 40H are shown provided in both flange portions of the member 40 for electrically connecting one or more components, leads or extension lines to 40. The conduit volume 40V may be utilized to retain and/or conduct a sheet transfer fluid for maintaining the temperature of 40 at a constant level or range during its operation. Said holes may also be utilized for fastening the strip member 40 to supporting means or against a board or wall. The notation 40H' refers to one or more small holes in the wall 40A and/or the wall 40B through which fluid circulated through 40V may pass for dispensing against adjacent components for convective cooling thereof.

I claim:

1. A method of forming an electrical circuit board comprising the steps of:

securing a sheet of homogeneous metal having a flat passageway interposed between major surfaces of said sheet to a first surface of an insulated circuit board, operating on said metal sheet to remove portions of said sheet from other portions thereof containing said passageway to define a plurality of flat strip elements secured to a surface of said circuit board with at least one of said surface secured flat strip elements having said flat passageway extending therethrough, applying fluid pressure to said passageway to expand the metal above said passageway outwardly from said circuit board and to form a duct integral with said sheet, electrically and mechanically connecting electrical circuit elements to at least certain of said tie strip elements secured to said circuit board to define an electrical circuit therewith, and connecting said duct in circuit with a fluid circulating system to provide fluid in said duct for the transfer of heat relative to said board and said electrical circuit.

2. A method in accordance with claim 1 including connecting said remaining portion of said metal sheet containing said passageway to a source of electrical energy whereby said passageway containing element also defines part of an electrical circuit.

3. A method in accordance with claim 2 including connecting said circuit element to an external portion of the duct.

4. A method of forming a circuit assembly comprising the steps of:

bonding a unitary sheet of metal having a flat passageway interposed between the major surface of said sheet to a first surface of a substrate to render a bonded assembly, applying sufficient fluid pressure to the interior of said flat passageway to expand the metal of said sheet above said passageway outwardly from said substrate without destroying the bond between the other surface of said sheet and the surface of said substrate, so as to form a duct integral with said sheet and capable of conducting a heat transfer liquid therethrough, forming an electrical circuit on at least one surface of said bonded assembly, and connecting the duct formed within said metal sheet with a fluid circulating system and flowing a heat transfer fluid through said duct so as to transfer heat relative to said substrate and the electrical circuit secured thereto.

5. A method in accordance with claim 4 including the intermediary step of etching portions of said metal sheet after it has been expanded so as to leave substantially the portions of said sheet containing the fluid expanded duct therein.

6. A method in accordance with claim 5 including the step of electrically and mechanically connecting the electrical circuit to the portions of said metal sheet remaining on the surface of said circuit substrate.

References Cited

UNITED STATES PATENTS

| | | | |
|---|---|---|---|
| 2,994,058 | 7/1961 | Dahlgren | 174—68.5 X |
| 3,010,091 | 11/1961 | Sawyer | 338—243 |

| | | | |
|---|---|---|---|
| 3,137,924 | 6/1964 | Wilkins | 338—226 X |
| 3,141,998 | 7/1964 | Silkman | 174—68.5 X |
| 3,166,829 | 1/1965 | Lemelson | 29—157.3 X |
| 3,195,226 | 7/1965 | Valyi | 29—157.3 X |
| 3,226,602 | 12/1965 | Elfving | 174—16 X |

FOREIGN PATENTS

| | | |
|---|---|---|
| 886,873 | 1/1962 | Great Britain. |

JOHN F. CAMPBELL, *Primary Examiner.*

R. W. CHURCH, *Assistant Examiner.*

U.S. Cl. X.R.

174—68.5; 338—226; 317—101; 29—155